United States Patent [19]

Tanaka et al.

[11] Patent Number: 5,774,313
[45] Date of Patent: Jun. 30, 1998

[54] MAGNETIC DISK WHICH REDUCES DETERIORATION IN REGENERATED SIGNALS DUE TO OPTICAL SERVO GROOVES

[75] Inventors: Kenji Tanaka; Teruhisa Miyata, both of Otokuni-Gun; Akira Miyake, Toride; Nobuhiro Umebayashi, Tsukuba, all of Japan

[73] Assignee: Hitachi Maxell, Ltd., Osaka-Fu, Japan

[21] Appl. No.: 515,446

[22] Filed: Aug. 15, 1995

[30] Foreign Application Priority Data

Aug. 15, 1994 [JP] Japan .................................... 6-214218

[51] Int. Cl.[6] .................................................. G11B 5/596
[52] U.S. Cl. ........................... 360/135; 369/14; 369/275.1
[58] Field of Search .................................... 360/135, 131, 360/77.03; 369/14, 275.1, 275.3, 275.4

[56] References Cited

U.S. PATENT DOCUMENTS

| | | | |
|---|---|---|---|
| 4,123,788 | 10/1978 | Kruger | 360/131 X |
| 4,935,835 | 6/1990 | Godwin et al. | 360/135 |
| 4,961,123 | 10/1990 | Williams et al. | 360/131 |
| 5,067,039 | 11/1991 | Godwin et al. | 360/135 |
| 5,430,594 | 7/1995 | Umebayashi et al. | 360/131 |

*Primary Examiner*—Stuart S. Levy
*Assistant Examiner*—William R. Korzuch

[57] ABSTRACT

A magnetic disk has optical servo grooves formed at specified intervals along data tracks so that variations in reflected light of light applied to the grooves are detected so as to allow a magnetic head to perform tracking servo. A level difference between a regenerative signal and a fundamental wave of modulation noise during reads of data recorded on the data tracks (4A, 4B) is set to 28 dB or more. Thus, comb-shaped modulation in a regenerative signal due to optical servo grooves is reduced so that output drop of the regenerative signal is suppressed and deterioration of window margin and the like is lessened.

16 Claims, 7 Drawing Sheets

COMPARISON EXAMPLE

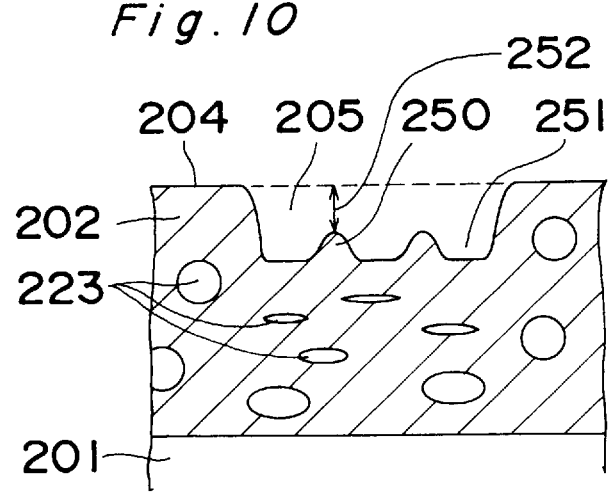
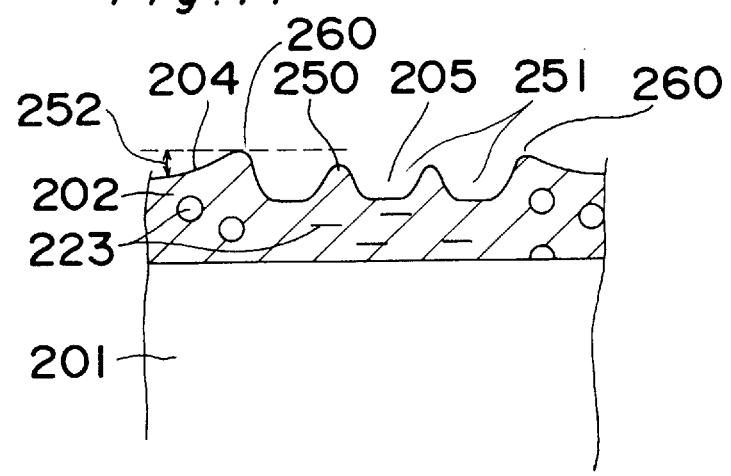

MAGNETIC DISK WHICH REDUCES DETERIORATION IN REGENERATED SIGNALS DUE TO OPTICAL SERVO GROOVES

BACKGROUND OF THE INVENTION

1. Field of the Invention

The present invention relates to magnetic disks such as a flexible disk to be used as a recording medium for data exchange, a backup disk for a hard disk, and a disk for storing a program.

2. Description of the Background Art

In order to read data recorded in a magnetic disk such as a flexible disk, it is necessary for a magnetic head to accurately trace data tracks provided in the disk. However, with increase in recording capacity thereof, the track density becomes higher or the track width becomes narrower. Therefore, the allowable displacement of the magnetic head during reading becomes considerably smaller. Previously, this problem has been solved by improving the mechanical accuracy of a servo system of the magnetic head to correct the displacement of the magnetic head. Nonetheless, a magnetic disk having a higher recording capacity is demanded, and the above-mentioned measure of improving the mechanical accuracy has a limit for improving the tracking accuracy.

Then, for a magnetic disk having a higher recording capacity, there has been developed a flexible disk which records data magnetically while using an optical servo technique for the tracking with the magnetic head. In such a flexible disk, many grooves of a width of, for example, approximately 5 $\mu$m are formed for optical servo at specified intervals along data tracks on the surface of the disk. Variations in the light reflected by the grooves are detected for tracking servo by the magnetic head. Thus, the tracking accuracy is improved remarkably, and this disk is useful for data tracks of high density.

However, in the magnetic disk having the structure as explained above, a part of the data tracks is affected by the machining accuracy of the optical servo grooves. Then, the reproduced output signal yields an output drop due to spacing loss at the sites of the grooves.

SUMMARY OF THE INVENTION

An object of the invention is to provide a magnetic disk of the above-mentioned type which can produce accurate regenerated signals by reducing deterioration due to the optical servo grooves.

In one aspect of a magnetic disk of the invention, a head tracks a data track with optical servo. The magnetic disk comprises a disk body and a magnetic recording layer formed on the disk body, and the magnetic recording layer comprises a data track and grooves for optical servo formed at specified intervals along the data track. It is a feature that a level difference between a regenerated signal and a fundamental wave of modulation noises during a read of data recorded on the data track is set to 28 dB or more.

In another aspect of a magnetic disk of the invention, a width of the groove $W_g$ has a value satisfying a relation $$(W_g - W_d)/W_a \leq 0.375,$$

wherein $W_d$ denotes a width of guard band and $W_a$ denotes a width of data track.

In a different aspect of a magnetic disk of the invention, grooves for optical servo have pits formed therein, and bumps formed between the pits having a height the same as the surface of the recording layer. For example, a void ratio in the grooves is between 3 and 15% for a recording layer comprising an underlayer and a magnetic layer, and it is between 5 and 20% for a recording layer comprising only a magnetic layer.

An advantage of the present invention is that noise jitters can be reduced largely in a high density magnetic disk.

BRIEF DESCRIPTION OF THE DRAWINGS

These and other objects and features of the present invention will become clear from the following description taken in conjunction with the preferred embodiments thereof with reference to the accompanying drawings, and in which:

FIG. 10 is a schematic sectional view of a magnetic disk having low bumps of another comparison example; and FIG. 11 is a schematic sectional view of a magnetic disk having low bumps of a different comparison example.

DETAILED DESCRIPTION OF THE PREFERRED EMBODIMENTS

Figure 1:
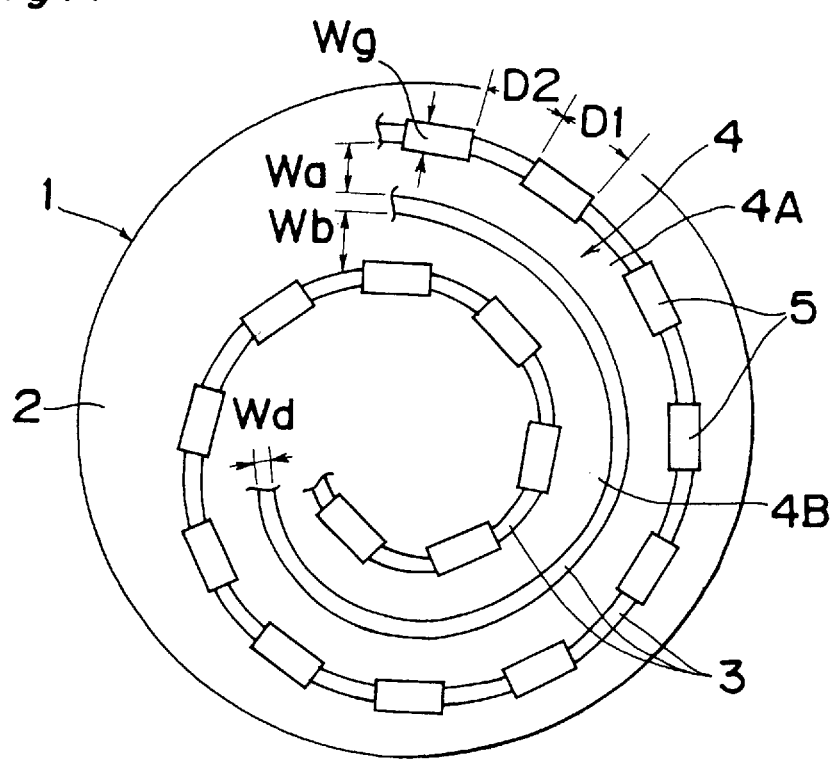
FIG. 1 is a schematic plan view of an outline of the layout of tracks in a flexible disk.
Figure 2:
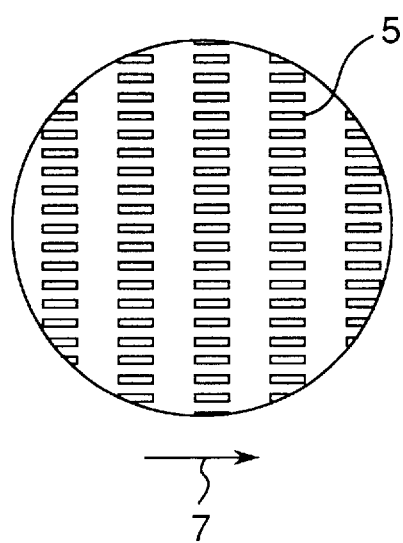
FIG. 2 is an enlarged plan view of a part of an example of an arrangement of the grooves formed on a part of the disk.
Figure 3:
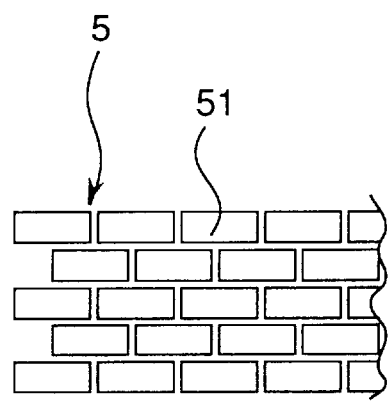
FIG. 3 is an enlarged plan view of a part of an example of a groove comprising five arrays of pits.

Referring now to the drawings, wherein like reference characters designate like or corresponding parts throughout the several views, FIG. 1 shows schematically a layout of a track 4 formed in a flexible disk 1 of an embodiment of a magnetic disk according to the invention. A recording layer 2 is formed on a front surface (or rear surface) of the disk body 20 (not shown). A high-density data track 4 comprising track portions 4A, 4B is formed into a spiral track interposing a guard band 3 having a width $W_d$ of approximately 2 $\mu$m between spiraling track portions 4A, 4B. Widths $W_a$, $W_b$ of the data track 4 formed at a high density are approximately 8 $\mu$m. The shape of the data track 4 is, or course, not limited to the spiral track 4, but it may be a concentric or any other arbitrary shape. A plurality of grooves 5 for optical servo with a width $W_g$ of approximately 5 $\mu$m provided at specified intervals on every other guard band 3, extending laterally into track portions. The width of the track 4 is reduced at parts adjacent to the grooves 5. The optical servo grooves 5 are formed by a stamping process or by heating and pressing with a stamper (not shown). The duty ratio of a circumferential length D1 of each groove 5 to a groove interval D2 is set to, for example, 50:50. FIG. 2 shows an example of an arrangement of the grooves 5 formed on a part of the disk 1 wherein an arrow 7 shows a running direction of the head. In FIG. 2, the grooves 5 are shown to be aligned in parallel with each other, while the track portions and guard bands are not shown for simplicity. As shown in FIG. 3, a groove comprising five arrays each including, for example, twenty pits 51 aligned along track direction.

Figure 4:
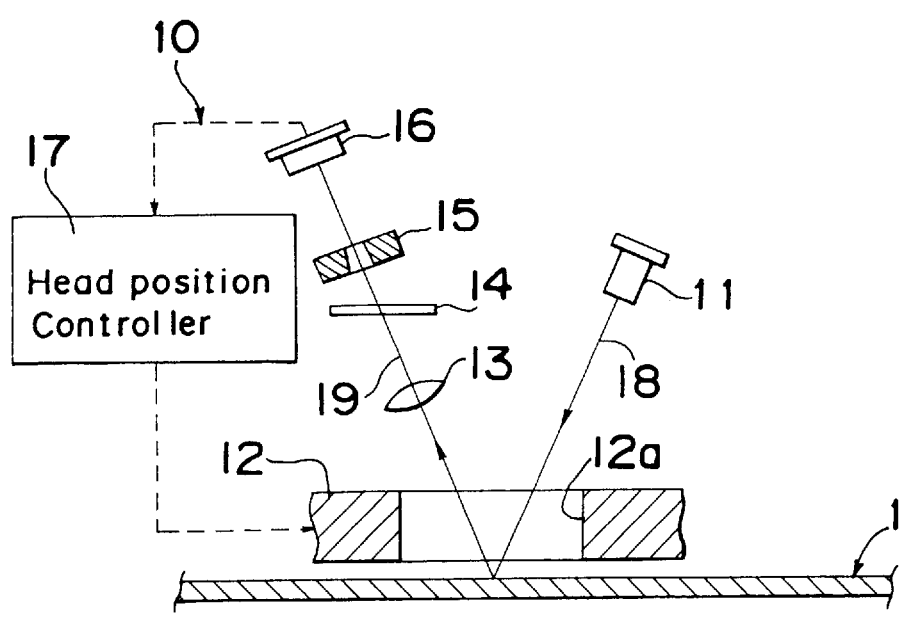
FIG. 4 is a schematic sectional view of an optical servo system used for tracking data track.

FIG. 4 shows schematically an optical servo system 10 used for the flexible disk 1. In the optical servo system 10, a light-emitting element 11 such as a light-emitting diode (LED), illuminates light 18 on the surface of the disk 1 through an aperture 12a of a read/write magnetic head 12. A light 19 reflected at the surface of the disk 1 transmits through a convergent lens 13, a routing mirror 14, and a light leakage adjuster 15 to a photosensor 16 that receives the reflected light 19 and transmits a detection signal to a head position controller 17. In reading data recorded on the data track 4 with the magnetic head 12, when the light 18 from the LED 11 illuminates the surface of the disk 1, the light 19 reflected off the surface of the disk 1 passes through the convergent lens 13 and the like and is received by the photosensor 16. The photosensor 16 detects the position of the magnetic head 12 from both bright light reflected from the surface of the disk body 1 and dark light reflected from the optical servo grooves 5, and transmits a detection signal to the head position controller 17. Then, the controller 17 corrects any positional shift of the magnetic head 12. Thus, the magnetic head 12 can track the data track 4 with high accuracy.

Figure 5:
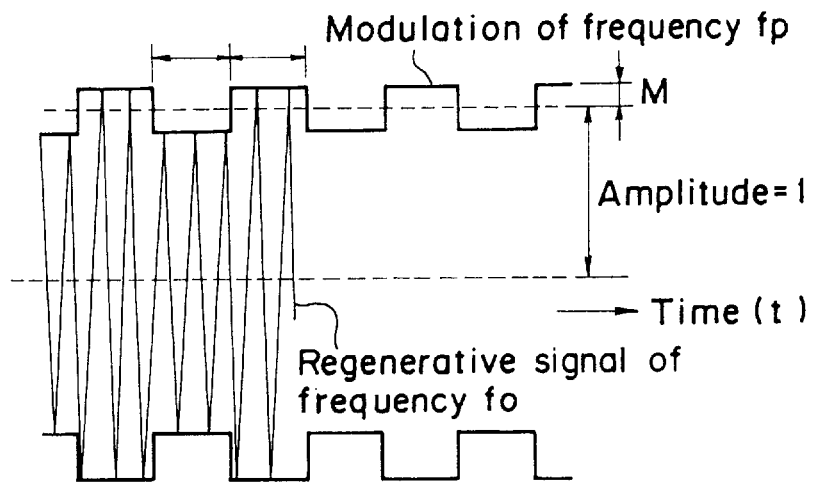
FIG. 5 is a diagram of a waveform of a regenerative output of a magnetic disk.

In order to produce accurate regenerated signals from the magnetic disk of the above-mentioned type by reducing deterioration due to the optical servo grooves 5, first, the inventors analyzed a regenerative output of a flexible disk having a spiral track 4 for optical servo with a width of approximately 5 μm. FIG. 5 shows an example of a regenerative output signal. A part of the data track 4 is affected by the machining precision of the optical servo grooves 5 such that the regenerative output yields an output drop due to a spacing loss at the sites of the grooves 5. In other words, as shown in FIG. 5, the regenerative output results in a comb-shaped waveform due to the output drop corresponding to a comb-shaped modulation having an amplitude M attributable to the grooves 5, where the amplitude of the regenerative output signal without the modulation is reduced as one. Without suppressing the comb-shaped modulation, a favorable regenerative signal could not be obtained, and the modulation causes an increase in the deteriorated portion of a window margin and the like.

When the amplitude of a regenerative signal S (of a cosine wave with a frequency $f_o$) is modulated by a square wave g(t) with a frequency of $f_p$ and a duty ratio of D1:D2=50:50, the resulting waveform k(t) is represented by the following Eq. 1:

$$k(t)=\{1+g(t)\}\cdot\cos \omega_o t, \quad (1)$$

where $$\omega_o=2\pi f_o. \quad (2)$$

If g(t) in Eq. 1 is expanded in Fourier series, k(t) can be expressed as follows:

$$k(t)=\cos \omega_o t+M\cdot(1/\pi)\cdot Y, \quad (3)$$

where M denotes the amplitude of comb-shaped modulation, $$\begin{aligned} Y = &\{\cos(\omega_o + \omega_p)t + \cos(\omega_o - \omega_p)t\} - \\ &1/3\{\cos(\omega_o + 3\omega_p)t + \cos(\omega_o - 3\omega_p)t\} + \\ &1/5\{\cos(\omega_o + 5\omega_p)t + \cos(\omega_o - 5\omega_p)t\} - , \end{aligned} \quad (4)$$

and $$\omega_p=2\pi f_p. \quad (5)$$

Figure 6:
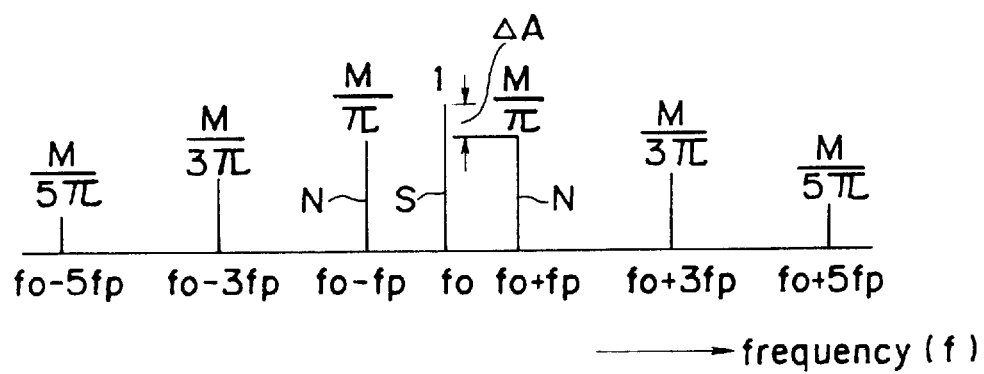
FIG. 6 is a view of the frequency spectrum of the same regenerative output.

As shown in FIG. 6, in the frequency spectrum of the above-mentioned comb-shaped regenerative output, there appears modulation noises (denoted as N in FIG. 6) due to the optical servo grooves 5 on both sides of a center at frequency $f_o$ of the regenerative signal S. If ΔA denotes a level difference between the regenerative signal S of frequency $f_o$ and the fundamental wave N of the modulation noises of frequency $f_o$ appearing on both sides, $$S/N \approx \Delta A/2, \quad (6)$$

by ignoring the higher frequency components of the modulation noise. As shown in FIG. 6, the level difference ΔA and the amplitude M of the comb-shaped modulation have a relationship such that $$\Delta A=S/N=1/(M/\pi)=\pi/M. \quad (7)$$

On the other hand, the relationship between noise jitters $T_{nj}$ and S/N ratio is expressed by the following Eq. 8:

$$T_{nj}=(4/\pi)\cdot\sin^{-1}(N/S)\times 100(\%). \quad (8)$$

If we substitute Eq. 6 in Eq. 8, $$T_{nj}=(4/\pi)\cdot\sin^{-1}(2/\Delta A)\times 100(\%). \quad (9)$$

Then, the relationship between the level difference ΔA and the noise jitter $T_{nj}$ can be expressed as shown below in Table 1 where noise jitter $T_{nj}$ represents a deteriorated portion of the window margin due to the comb-shaped modulation.

TABLE 1

| Relation between the level difference ΔA and the noise jitter $T_{nj}$ | |
|---|---|
| $T_{nj}$ (%) | ΔA (dB) |
| 1 | 48.1 |
| 2 | 42.1 |
| 3 | 38.6 |
| 4 | 36.1 |
| 5 | 34.1 |
| 6 | 32.5 |
| 7 | 31.2 |
| 8 | 30.0 |
| 9 | 29.0 |
| 10 | 28.1 |

According to the level difference ΔA between the regenerative signal S and the fundamental wave N of modulation noises, it is found that a desired regenerative signal S can be obtained and the noise jitter $T_{nj}$ can be suppressed, by reducing the comb-shaped modulation M in the regenerative output. In general, window margin for absorbing data fluctuations due to the data processor and external noises is about 40% of a width of data detection window, except bit shifts and jitters of regenerative data caused by the recording medium and the head system. Jitters due to comb-shaped modulation reduces the window margin, and they are allowed to be at most 3% (ΔA=39 dB). However, if the window margin of 40% or more is secured by improving the characteristics of the medium or the like, it is allowed to be 10% (ΔA=28 dB) or less. Therefore, the level difference ΔA between a regenerative signal and a fundamental wave of modulation noises is set at 28 dB or more, and more preferably at 39% or more.

That is, the present invention is directed to provide a magnetic disk wherein the level difference ΔA between a regenerative signal and a fundamental wave of modulation noise during reading of data recorded on the data track 4 is set to 28 dB or more. In the magnetic disk where the level difference ΔA is set at 28 dB or more, noise jitters are reduced so that less comb-shaped modulation appears on regeneration. Thus, deterioration of the window margin on the screen can be suppressed effectively.

Figure 7:
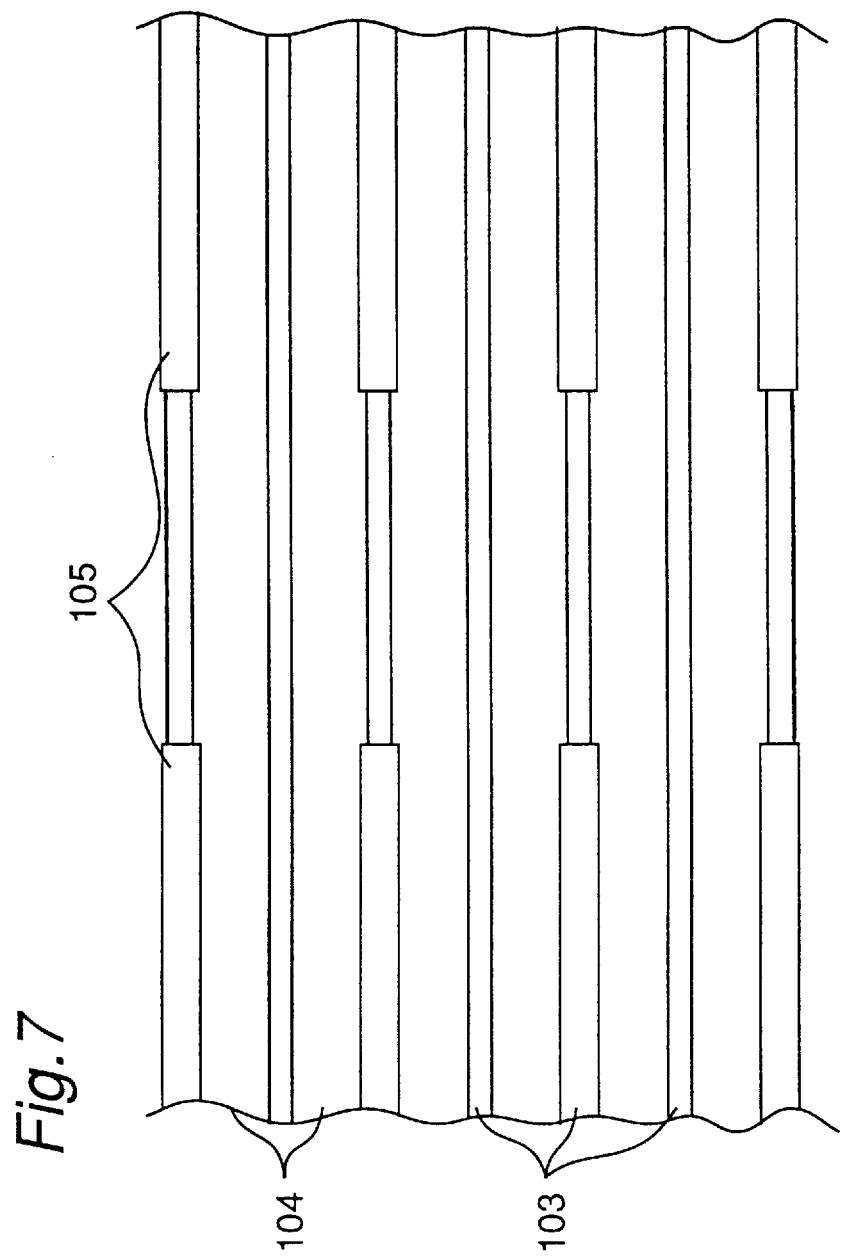
FIG. 7 is a view of a magnetic disk having a different track layout.

FIG. 7 shows another type of layout of magnetic tracks 104 and guard bands 103 formed on a magnetic layer of a magnetic disk. Grooves 105 referred to as servo stitches in correspondence to the grooves 5 shown in FIG. 1 are formed at specified intervals along every other guard bands 103, and they are composed of pits similarly to the groove 5 shown in FIG. 3. In the example shown in FIG. 7, the magnetic track 104 has a width of 8 μm, and guard bands 103 with and without grooves 105 have widths of 2.4 and 2 μm, respectively, while the grooves 105 have widths of approximately 3 μm. Therefore, the width of the track 104 is affected by the existence of the grooves 105. Then, this type of magnetic disk also has the above-mentioned comb-shaped modulation in the regenerative output.

In the disks shown in FIGS. 1 and 7, if $L_a$ denotes a decrease in width of data track due to the existence of the groove, $$L_a = (W_g - W_d)/2, \quad (10)$$

where $W_g$ denotes the width of the groove 5, 105 and $W_d$ denotes the width of the guard band 3, 103. In order to increase the level difference ΔA above 28 dB, if an output signal is assumed to become zero at a groove 5, 105, $$L_a/W_a < 0.125, \quad (11)$$

where $W_a$ denotes a width of the data track 4, 104. Therefore, the groove width $W_g$ is set to satisfy a following equation:

$$(W_g - W_d)/W_a \leq 0.375. \quad (12)$$

The regenerative output signal during data reads by the magnetic head 12 has a comb-shaped waveform because of the spacing loss due to the optical servo grooves 5, 105. However, if the level difference ΔA between the regenerative signal S and the fundamental wave N of modulation noise has been set at 28 dB or more, noise jitters $T_{nj}$ are reduced so that less comb-shaped modulation M appears during regeneration, so that deterioration of the window margin on the screen can be suppressed effectively.

Figure 8:
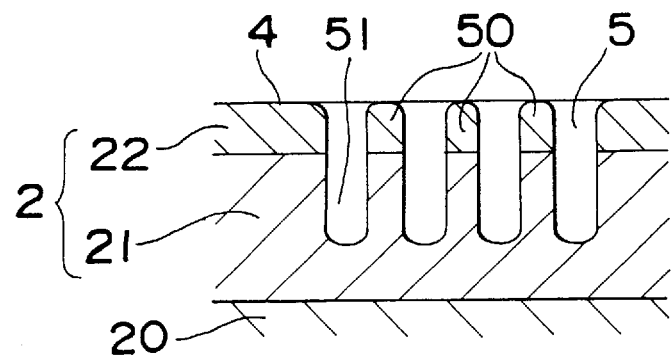
FIG. 8 is a sectional view of a groove formed in the recording layer.

FIG. 8 shows a section of a groove 5 formed in the recording layer 2 at front and/or rear surfaces of the disk body or base film 20 in the flexible disk 1 having the above-described arrangement. The bumps 50 are formed between the pits 51, as shown in FIG. 3. The recording layer 2 is composed of a non-magnetic underlayer 21 and a magnetic layer 22. The non-magnetic underlayer 21 is formed by coating a non-magnetic paint containing carbon black, barium sulfide or titanium oxide to a thickness of approximately 1.3 μm on top of a base film 20 made of polyester film or the like. The magnetic layer 22 is formed by coating a magnetic paint containing a magnetic material such as barium ferrite to a thickness of approximately 0.4 μm on top of the underlayer 21.

When the grooves 205 are formed to have a shape as shown in FIG. 8, the level difference ΔA between the regenerative signal S and the fundamental wave N of modulation noises can be easily set to be 28 dB or more, and the comb-shaped modulation during regeneration can be reduced as much as possible so that noise jitters, namely, deteriorated portions of the window margin can be suppressed as much as possible. By adopting an optimal combination of the aforementioned void ratio with conditions such as the stamping pressure and temperature, it is found that a magnetic disk having the level difference ΔA of 34 dB or more and, more preferably, 39 dB or more, can be provided and that the above-mentioned advantages of the reduction of the modulation and the window margin become even more remarkable.

The optical servo grooves 5 are formed on either the front or rear surface of the disk 1 having the recording layer 2. This formation is carried out by a heating and pressing process using a stamper at specified sites on the surface of disk body 20, for example, by a heating and pressing process at 50° to 60° C. under 40 to 60 tons/cm² for approximately five seconds. The grooves 5 have the pits 51 aligned as for example five lines. In this process, if a total void ratio of the underlayer 21 and the magnetic layer 22 is set to be approximately 3 to 15% and if this void ratio is appropriately combined with the above conditions such as the stamping pressure and temperature, optical servo grooves 5 formed have a large number of minute bumps 50 within the grooves 5, and the bumps 50 have a height which agrees with the surface of the magnetic layer 22. The void ratio is measured as (x/0.86)/V if x (g) denotes a maximum weight of oleilolate (having a density of 0.86) per unit area of disk impregnated in a disk and V (cm³) denotes a volume of the film applied to the disk or film thickness times area. Thus, a spacing within the grooves 5 and a spacing on the data track become both small, and output deterioration can be suppressed. In the disk shown in FIGS. 10 and 11 having a single layer of the recording layer 2 (and displaying voids 223 schematically), a total void ratio of the underlayer 21 and the magnetic layer 22 is set to be approximately 5 to 20%, more preferably between 5 and 10%. It is preferable that this condition is combined with the condition of Eq. 12. It is also preferable that the condition of Eq. 12 is maintained for grooves 5 with no bumps therein. Such grooves can be prepared with laser cutting.

Figure 9:
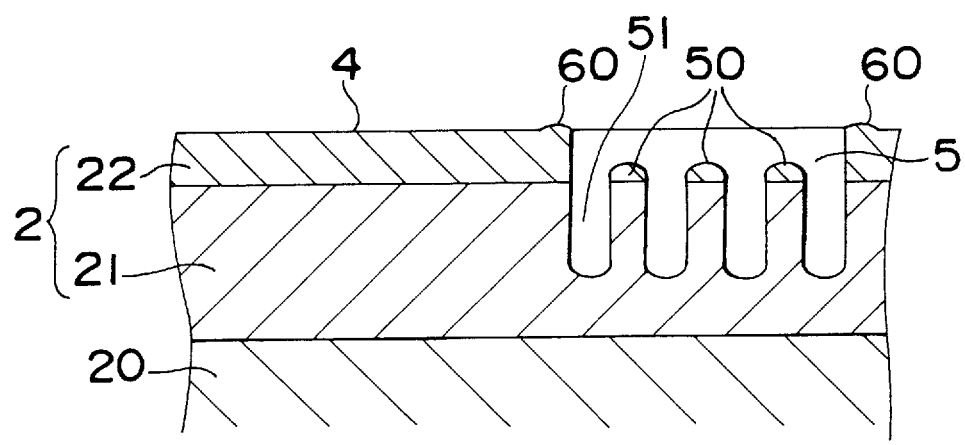
FIG. 9 is a comparison example of a recording layer with a total void ratio of approximately 20%.

Meanwhile, FIG. 9 shows a comparison example of a recording layer 2 with a total void ratio of approximately 20% by using the heating and pressing method. Minute bumps 50 formed in the groove 5 are liable to have levels of their tops located at positions recessed more than the surface of the magnetic layer 22, or have swollen portions 60 or bumps formed around the rims of the groove 5.

FIGS. 10 and 11 show other comparison examples having grooves 205 schematically for a magnetic disk having data tracks 204 and comprising a disk body 201 and a magnetic layer 202 formed thereon. FIG. 10 shows a case where the magnetic layer 202 is thick and includes many voids 223. The height of bumps 250 in the groove 205 is lower than the surface of the magnetic layer 202. Therefore, a loss due to a spacing 252 occurs in the groove 205, and a regenerative output becomes smaller. On the other hand, FIG. 11 shows another case where the magnetic layer 202 is thin and includes a smaller amount of voids 223. Then, the height of bumps 260 at the rims of the groove 205 become higher and the head moves above the bumps 250 so that a spacing loss occurs on track servo. Both FIGS. 10 and 11 include pits 251 formed in respective grooves 205 while FIG. 11 illustrates swollen portions or bumps 260 formed around the rim of groove 205.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magnetic disk comprising:

a disk body;

a magnetic recording layer formed on said disk body, said magnetic recording layer comprising data tracks and grooves for optical servo formed at specified intervals parallel with the data tracks, the grooves overlapping on the data tracks such that the data tracks are narrowed where the grooves overlap; and level difference means formed on the magnetic disk for enabling a level difference of 28 dB or more between a regenerated signal and a fundamental wave of modulation noises during reading of data recorded on the data tracks, the magnetic disk further having plural guards bands, a guard band being between adjacent data tracks and the grooves being formed only on every other guard band, wherein a width $W_g$ of the grooves has a value satisfying a relation $(W_g - W_d)/W_a \leq 0.375$, wherein $W_d$ denotes a width of the guard bands and $W_a$ denotes a width of the data tracks formed on the magnetic disk.

2. The magnetic disk according to claim 1, wherein the data tracks comprise spiral tracks.

3. The magnetic disk of claim 1, wherein the grooves have pits formed therein with bumps being formed between the pits, the bumps having a height the same as a surface of said magnetic recording layer.

4. The magnetic disk of claim 3, wherein said magnetic recording layer comprises an underlayer formed on said disk body and a magnetic layer formed on said underlayer, a void ratio in the grooves being between 3 and 15%.

5. The magnetic disk of claim 3, wherein said magnetic recording layer comprises a magnetic layer formed on said disk body, a void ratio in the grooves being between 5 and 20%.

6. The magnetic disk of claim 1, wherein the grooves include no bumps.

7. A magnetic disk comprising:

a disk body; and a magnetic recording layer formed on said disk body, said magnetic recording layer comprising data tracks and grooves for optical servo formed at specified intervals parallel with the data tracks, the grooves overlapping on the data tracks such that the data tracks are narrowed where the grooves overlap, the magnetic disk further having plural guards bands, a guard band being between adjacent data tracks and the grooves being formed only on every other guard band, wherein a width of the grooves $W_g$ has a value satisfying a relation $(W_g - W_d)/W_a \leq 0.375$, wherein $W_d$ denotes a width of the guard bands and $W_a$ denotes a width of the data track formed on the magnetic disk, the magnetic disk having plural data tracks and plural guard bands, a guard band being between adjacent data tracks and the grooves being formed only on every other guard band.

8. The magnetic disk according to claim 7, wherein the data tracks are spiral tracks.

9. The magnetic disk according to claim 7, wherein the grooves do not include bumps.

10. The magnetic disk of claim 7, wherein the grooves have pits formed therein with bumps being formed between the pits, the bumps having a height the same as a surface of said magnetic recording layer.

11. The magnetic disk of claim 10, wherein said magnetic recording layer comprises an underlayer formed on said disk body and a magnetic layer formed on said underlayer, a void ratio in the grooves being between 3 and 15%.

12. The magnetic disk of claim 10, wherein said magnetic recording layer comprises a magnetic layer formed on said disk body, a void ratio in the grooves being between 5 and 20%.

13. A magnetic disk comprising:

a substrate;

a magnetic recording layer formed on said substrate, said magnetic recording layer comprising a data track; and grooves for optical servo formed at specified intervals parallel with the data track, the grooves overlapping on the data track such that the data track is narrowed where the grooves overlap, the grooves having pits formed therein with bumps formed between the pits having a height the same as a surface of said magnetic layer, width $W_g$ of the grooves has a value satisfying a relation $(W_g - W_d)/W_a \leq 0.375$, wherein $W_d$ denotes a width of a guard band and $W_a$ denotes a width of the data track, the magnetic disk having plural data tracks and plural guard bands, a guard band being between adjacent data tracks and the grooves being formed only on every other guard band.

14. The magnetic disk according to claim 13, wherein said magnetic recording layer comprises an underlayer formed on a disk body and a magnetic layer formed on said underlayer, a void ratio in the grooves being between 3 and 15%.

15. The magnetic disk according to claim 13, wherein said magnetic recording layer comprises a magnetic layer formed on a disk body, a void ratio in the grooves being between 5 and 20%.

16. The magnetic disk according to claim 13, wherein the data tracks are spiral.

* * * * *